Figure 1:
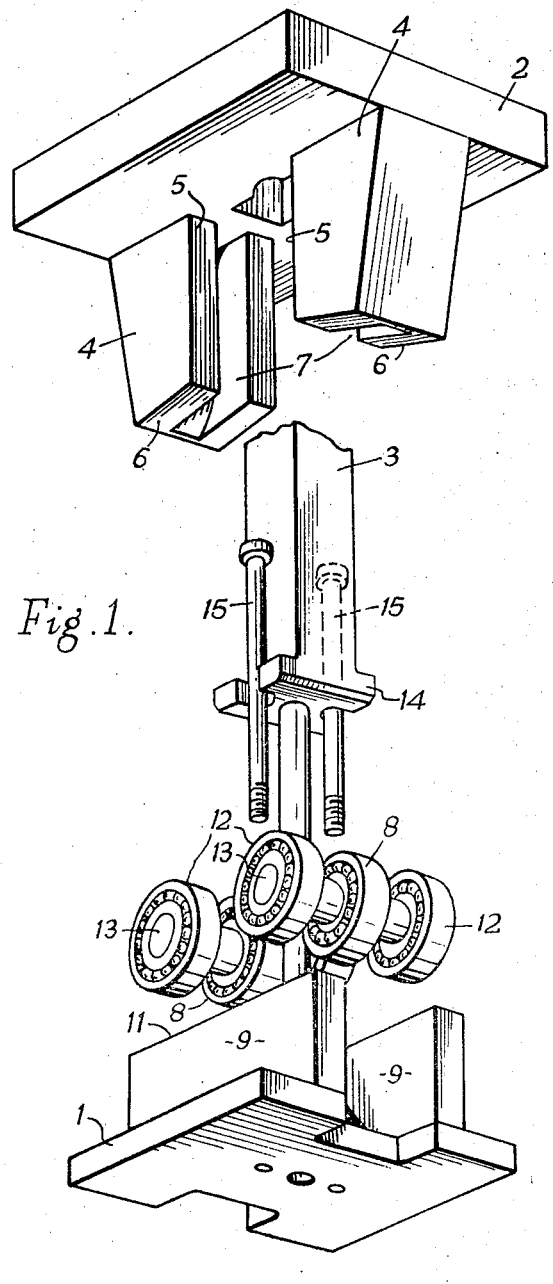

Nov. 15, 1960          D. K. BUDD          2,959,814
LOCKING MECHANISMS
Filed Aug. 25, 1958                2 Sheets-Sheet 1

INVENTOR
Donald Kenneth Budd
BY
W.B.Harpman
ATTORNEY

Nov. 15, 1960  D. K. BUDD  2,959,814
LOCKING MECHANISMS
Filed Aug. 25, 1958  2 Sheets-Sheet 2

INVENTOR
Donald Kenneth Budd
BY
W. B. Harpman
ATTORNEY

United States Patent Office 2,959,814
Patented Nov. 15, 1960

2,959,814

LOCKING MECHANISMS

Donald Kenneth Budd, 6 Vincent Square, Wood Green, London N.22, England

Filed Aug. 25, 1958, Ser. No. 756,948

Claims priority, application Great Britain Sept. 4, 1957

3 Claims. (Cl. 18—16)

This invention relates to locking mechanisms, and in particular to locking mechanisms of the kind which may be used to hold a press, such as an injection moulding press or a die-casting press, locked in the closed position during an injection or casting stroke. Although the invention may find its principal use in locking press platens in the closed position, it is not to be construed as being limited to such use since it may also be used for other purpose, for example it may be used in the locking of the gate of a gate valve in the closed position.

It is an object of the invention to provide a locking mechanism of mechanical character which is simple in construction and smooth and positive in action, and which will produce a positive locking which is resistant to considerable forces.

According to the invention there is provided a locking mechanism in which a movable part such as a movable platen in an injection moulding press is to be lockable in a particular position relative to a containing press frame to prevent movement relative to the frame, wherein the movable part is formed with at least one flat surface substantially normal to the direction of movement, the press frame having at least one guiding face extending substantially parallel to the direction of movement and terminating in an inclined face making an acute angle with said flat surface, a wedging surface movable with the movable part to force locking members into engagement between the flat surface and the inclined face when the movable part is in the position in which it is to be locked.

The locking members will normally be cylindrical so that they will roll upon the guiding face and the flat surface, and a particularly convenient form for the locking members comprises two or more ball races carried upon a shaft the outer ring of the ball races engaging the flat surface, whilst the shaft engages the guiding face and the inclined face. The wedging surface may engage the outer ring of at least one of the ball races and it is desirable that the outer ring of this ball race should be otherwise free so that the wedging member is free to move, for example in completion of the injection stroke, whilst it holds the locking members in engagement. Where the wedging member continues to move after the movable part has been located relative to the containing frame, it is necessary that there should be some lost motion between the wedging member and the movable member.

In use, the movable member, when it is in position other than in the position in which it is to be locked, is capable of free longitudinal movement relative to the press frame, the locking members resting upon the flat surface thereof and also bearing against the guiding face. The wedge may also bear lightly upon the locking members but is not in such a position as to tend to force them into engagement with any of the other surfaces, or to restrict their rotation. When the movable member comes to the position in which it is to be locked, that is, in the position when the movable platen of the press is brought into close abutment with the fixed platen, the movable member is held against movement in one direction by a stop which, in the case of the press, will be the abutment of the movable and fixed platens. When the movable member has reached this position, the wedge continues to advance, being free to do so because of the lost motion allowed between it and the movable member and, in advancing, it forces the locking members into engagement between the inclined face which is the termination of the guiding face and the flat surface upon the movable member. By the correct positioning of the movable face and the inclined faces and the provision of locking members of the correct size, the movable platen may be positively locked against movement relative to the frame and will be immovable from its locked position, even though high-powered forces may be exerted against the lock. When unlocking is required, the wedge is first of all withdrawn so that the locking members are free to move from their locking position between the inclined faces and the flat surface and, as the lost motion is taken up and the movable members tend to move, the locking members ride over the inclined faces until they bear against the guiding faces.

It will be appreciated that a number of locking members may be provided and that the movable member may be provided with more than one flat surface and that more than one guiding surface may be provided.

Figure 2:
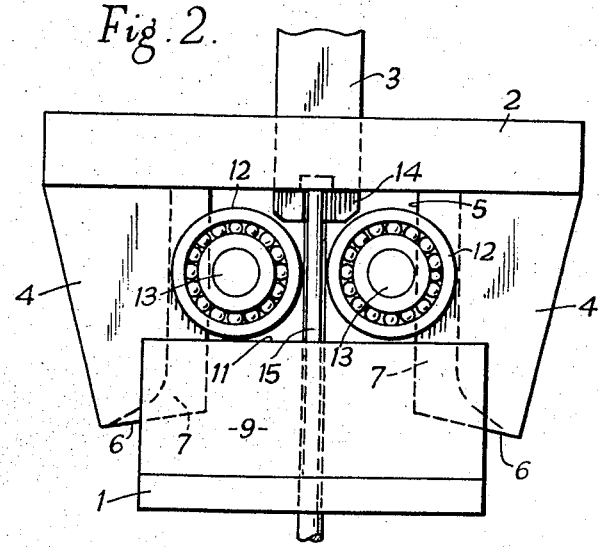
Figure 3:
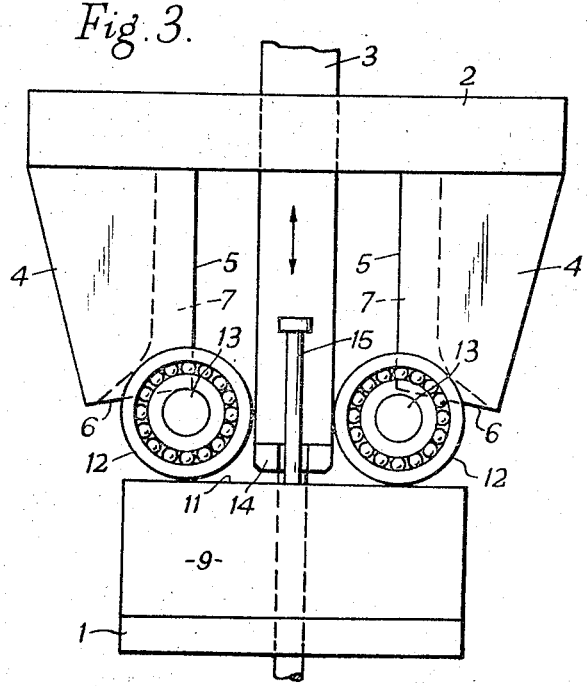

In order that the invention may be clearly understood, one embodiment thereof will now be described by way of example with reference to the accompanying diagrammatic drawings in which:

Fig. 1 is an exploded view of the essential parts of the locking mechanism according to the invention, Fig. 2 is a side elevation of the locking mechanism in the unlocked position, and Fig. 3 is a side elevation showing the mechanism in the locked position.

For the sake of simplicity, only the essential parts of the locking mechanism have been shown in the drawings, and these are shown in a purely diagrammatic manner.

In the drawings, the part 1 is the movable part of a press. It may for example be the platen of a press or it may be a back plate assembly which is secured to the movable platen by means of suitable distance pieces. The part 2 is a part of the frame of the press and may conveniently be the head plate of the frame. The part 3 may be a ram of an injection moulding press, or a corresponding part which is advanced and retracted upon the operative strokes of the press. From the head plate 2 there depends a pair of guide members 4, each of which is formed with a pair of guiding surfaces 5 which extend substantially parallel to the direction of movement of the member 3. These faces terminate at the end remote from the member 2 in inclined faces 6. The guiding surfaces 5 upon the guide members 4, are separated by a channel 7 formed in the members 4, which channel serves to accommodate the centre ball race 8 of the locking member. The movable part 1 includes a pair of upstanding parallel plates 9, each of which is formed with a flat surface 11 extending substantially normally to the direction of movement of the member 3. Each of the locking members comprises three bearing races 12 and 8 mounted upon a shaft 13. The member 3 is formed with a wedge-shaped portion 14 upon its leading end, and is connected to the member 1 by means of a pin 15 extending through apertures in the wedging member 14 so as to allow a desired degree of lost motion between the movement of the plate 1 and the member 3.

When the mechanism is in the unlocked position (see Fig. 2), the locking members are located with the outer ring of the outer bearing races 12 engaging the flat surface 11, whilst the shaft 13, at a point between the outer bearing races 12 and the inner bearing race 8 rides upon the guiding surfaces 5. The inner bearing race 8 is located within the slot 7, thereby preventing longitudinal movement of the locking members, and the bearing races are supported in a position clear of the wedging member 14. In this position free relative movement between the movable member 1 and the press frame 2 is possible, and there is no risk of the locking members binding between any parts of the locking mechanism to prevent free relative movement.

As the press is closed, that is as the member 1 is moved downwardly as shown in Fig. 2, this free movement continues until the further movement of the member 1 is stopped. This will normally occur when the platens of the press close together. At this point, the member 3 is still free to move in a downwardly direction due to the lost motion allowed between the members 1 and 3, and this brings the wedging member 14 into abutment with the outer ring of the central ball race 8. This causes the two locking members to move outwardly from their original position so that the shaft 13 now engages the inclined faces 6. Finally, the position shown in Fig. 3 is reached, in which the member 1 is locked against relative movement relative to the frame member 2. In this position, the outer ring of the outer bearing races 12 of the locking member engage the flat surface 11 whilst the shaft 13 of the locking member engages the inclined faces 6. The outer ring of the central bearing race 8 engages the surface of the wedging member 14, and if this is further depressed, the side faces of the member 3. Thus, the wedging member 14 and the member 3 prevent the locking members moving inwardly as shown in the drawings and hold them in a position where they are firmly engaged between the flat surfaces 11 and the inclined surfaces 6. The press is thus firmly locked and can only come open if the opening pressure exerted is sufficient to collapse the locking members. At the same time, the member 3, is not restrained from further movement, for example to complete the injection stroke in an injection moulding press, since the sides of the member 3 engage the outer ring of the central bearing race 8 of the locking member which is free to rotate relative to the shaft of the locking member.

On the return stroke, the member 3 moves upwardly as shown in Fig. 3, until it reaches a position where the sides of the member 3 and the wedging face of the wedging member 14 no longer engage the outer ring of the central bearing races 8. At this point, the wedging member 14 reaches the upper end of the pins 15, thereby insuring the repositioning of the member 1. This causes the locking members to move inwardly as shown in the drawings, with the shaft 13 rolling upon the inclined face 6 until it again bears against the guiding face 5. The locking mechanism is then again in its original position as shown in Fig. 2.

What I claim is:

1. A locking mechanism in which a movable part is to be lockable in a particular position relative to a containing frame to prevent movement of the moving part relative to the frame, in which said movable part is formed with at least one flat surface substantially normal to the direction of movement, said frame carries at least one guiding face extending substantially parallel to the direction of movement and terminating in an inclined face making an acute angle with said flat surface, a wedging surface movable with the movable part and at least one locking member arranged to be moved into engagement between said flat surface and said inclined face by said wedging surface when said movable part is in the position in which it is to be locked, each locking member comprising at least two ball races carried upon a shaft, the outer ring of at least one ball race engaging said flat surface and the outer ring of at least one other ball race engaging said wedging surface, the shaft engaging said guiding face and said inclined face.

2. A locking mechanism according to claim 1 in which the outer ring of the bearing races engaging the wedging surface is otherwise free when it is engaged by the wedging surface so that the member upon which the wedging surface is formed is free to move relative to the locking member whilst retaining the locking member in the locking position.

3. A locking mechanism in which a movable part is to be lockable in a particular position relative to a containing frame to prevent movement of the moving part relative to the frame, in which said movable part is formed with at least one flat surface substantially normal to the direction of movement, said frame carries at least one guiding face extending substantially parallel to the direction of movement, and terminating in an inclined face making an acute angle with said flat surface, a wedging surface movable with the movable part and at least one locking member arranged to be moved into engagement between said flat surface and said inclined face by said wedging surface when said movable part is in the position in which it is to be locked, each locking member comprising at least two ball races carried upon a shaft, the outer ring of at least one ball race engaging said flat surface and the outer ring of at least one other ball race engaging said wedging surface, the shaft engaging said guiding face and said inclined face, the member carrying the wedging surface and the movable part being connected together by means of a linkage which allows a degree of lost motion therebetween.

References Cited in the file of this patent

UNITED STATES PATENTS

| | | |
|---|---|---|
| 2,496,344 | Hall | Feb. 7, 1950 |
| 2,785,439 | Gastrow | Mar. 19, 1957 |